Dec. 2, 1969  R. M. STAFFORD  3,481,087
WEATHERPROOFING SYSTEM AND ENVELOPE PANEL THEREFOR
Filed Feb. 5, 1968  2 Sheets-Sheet 1

INVENTOR:
ROBERT M. STAFFORD

BY Parrott, Bell, Seltzer, Park & Gibson
ATTORNEYS

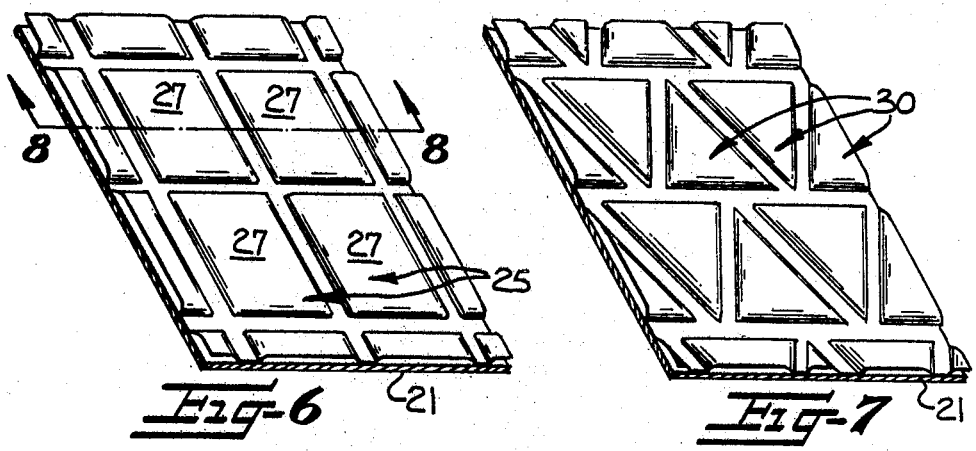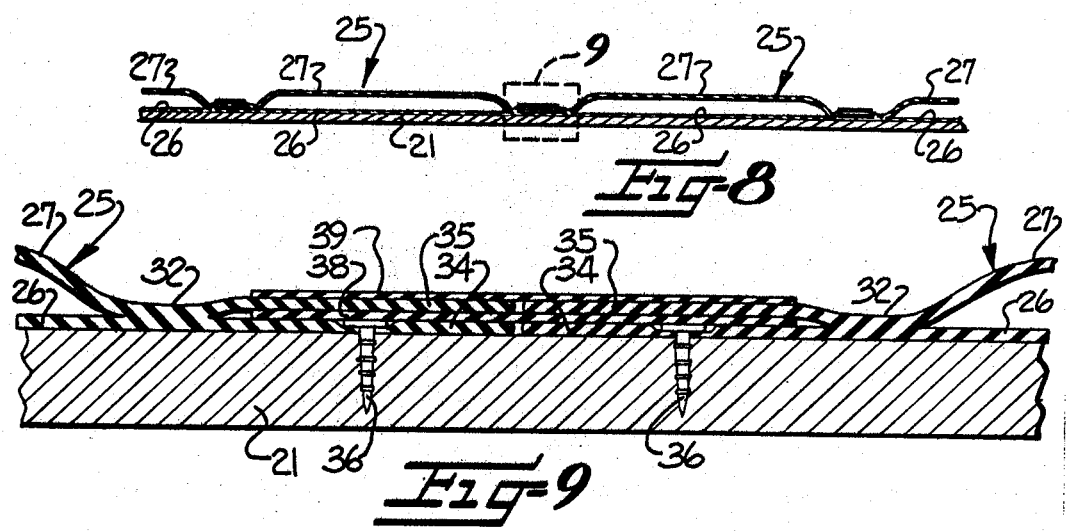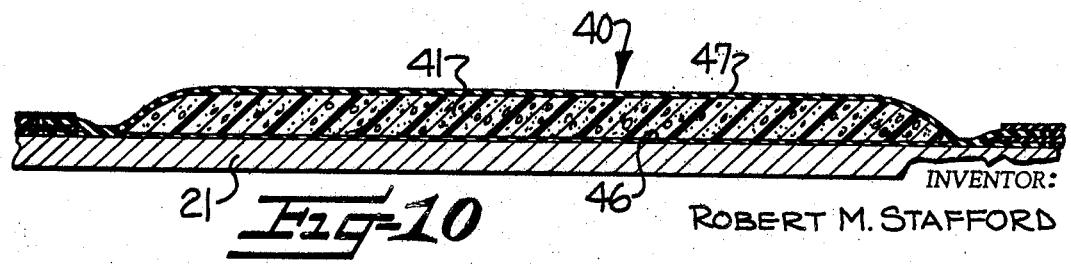

United States Patent Office 3,481,087
Patented Dec. 2, 1969

3,481,087
WEATHERPROOFING SYSTEM AND ENVELOPE PANEL THEREFOR
Robert M. Stafford, P.O. Box 11075,
Charlotte, N.C. 28209
Filed Feb. 5, 1968, Ser. No. 702,932
Int. Cl. E04b 1/66, 5/43; E04d 1/36
U.S. Cl. 52—2                                                5 Claims

ABSTRACT OF THE DISCLOSURE

A weatherproofing system wherein a plurality of envelope panels each comprising two membranes separated by a filling material are arranged to provide a weathertight surface over a supporting substrate structure and a method of making the envelope panels.

---

Roofing and weatherproofing systems now in commercial use include, among others, certain systems which rely upon elastomeric membranes, such as synthetic rubber membranes, for providing a watertight barrier. While waterproofining systems of this type are attractive, as relatively thin films of a number of commercially available materials are suitable for use as membranes and are readily shaped to any desired configurations, the growing commercial importance of such systems has brought to light a number of deficiencies as such systems are presently applied.

Before describing some of the problems which have been encountered, it is appropriate first to briefly describe those membrane systems which have been noted to present problems Typically, a supporting substrate structure is provided, which may be in the form of a roof decking of wood or of a number of other available materials useful for this purpose, laid on appropriate rafters, trusses or the like. A thin film or membrane of elastomeric material such as a synthetic rubber is applied to the exterior surface of the decking, to provide a weatherproof surface thereon. The membrane, in order to maintain a weathertight protective film, must be adhered to the substrate structure without puncture or penetration of the film, and accordingly is conventionally applied by uniformly coating the decking with a suitable adhesive. Joints between adjacent panels of the film are made weathertight by an appropriate non-penetrating seal, such as an adhesive bond or heat-sealed bond of overlapped edges of the membrane.

In waterproofing systems of the type just described, difficulties are encountered in obtaining a tight and permanent bond to some substrate materials, as the adhesives used must necessarily be compatible with the membrane material and some substrate materials are not adequately gripped by such adhesives. Partially due to this fact, high skill is required of the mechanics applying the membranes in order to maintain an acceptably watertight and smooth appearing surface. When a satisfactory bond is obtained, the relatively thin membrane readily conforms to any irregularities in the surface of the substrate structure, and thus permits such defects to be readily visible to an observer viewing the structure to which the weatherproofing system has been applied. Such appearance defects are compounded by the fact that most if not all such membrane materials presently available have a high coefficient of thermal expansion relative to that of the materials used in the substrate construction. This factor frequently results ultimately in permanent distortion of the membrane due to the cycle of temperature variation, further contributing to an unsightly appearance. In a similar manner, even slight movements of the substrate structure often cause wrinkling, ridging, or other distortions of the membrane. Due in part to the very nature of the membrane and in part to appearance defects as reviewed above, continuing maintenance of such an installation is made quite difficult by the near-impossibility of locating a small puncture or tear which will permit the entry of water and thus destroy the weatherproof capability of such a system.

It has now been determined that a great number of the difficulties heretofore encountered in the application of membrane waterproofing systems may be avoided by providing a means other than a uniform adhesive coating by which a membrane-type waterproofing system may be secured to a substrate structure while maintaining a watertight sealing surface and constructing the system to conceal visual defects which would otherwise detract from the appearance of the finished surface of a building to which the system is applied and to facilitate ready location of a small puncture or tear in the surface of the membrane. Accordingly, it is an object of this invention to provide a weatherproofing system using a membrane material wherein the deficiencies heretofore present in such systems are avoided. In accomplishing this object of the invention, the present system employs a plurality of envelope panels, each formed by two membranes secured together to form a sealed envelope and including a filling material within the envelope formed by the membranes for normally holding the membranes in predetermined spaced relation substantially throughout the area of the panel. By holding the membranes in spaced relation in this manner, a membrane in engagement with the substrate structure may accommodate irregularities in the surface of the structure, while the exposed appearance membrane maintains a smooth appearance and is not distorted as is the substrate engaging membrane. Further, puncture or tearing of the sealed envelope may result in a ready indication of the location of a leak by escape of filling material permitting the relationship of the membranes forming the otherwise sealed envelope to change.

Yet another object of the present invention is the provision of a sealed envelope adapted for inclusion in a weatherproofing system of the type described. In accomplishing this object of the present invention, the envelope is so constructed as to facilitate ready attachment of the envelope to a substrate structure without necessarily relying upon conventional techniques such as an adhesive coating, thereby reducing the skill required of mechanics installing the envelope panels and making a saving of labor costs possible without increasing the difficulties or problems of such an installation.

Yet another object of the present invention is to provide a method of manufacturing an envelope panel adapted for use in a system of the type described. The method of this invention, as described more fully hereinafter, permits accommodation of the procedure followed either to factory production of relatively small panels or to partial fabrication of large panels at a factory location and completion of panel manufacture at the site of installation of the weatherproofing system.

Some of the objects and advantages of the invention having been stated, others will appear as the decription proceeds, when taken in connection with the accompanying drawings, in which—

FIGURE 6 is an enlarged perspective view of a portion of the roof surface of the building structure of FIGURE 1, taken as indicated by the dash line area 6 in that figure;

FIGURE 7 is a view similar to the view of FIGURE 6 illustrating the use of the form of panel shown in FIGURE 3;

FIGURE 8 is an enlarged section view through the roofing system structure shown in FIGURE 6 taken substantially along the line 8—8 in that figure;

FIGURE 9 is an enlarged detail of the section view of FIGURE 8 taken as indicated by the dash line area 9 in that figure; and FIGURE 10 is an elevation view in section, somewhat similar to the view in FIGURE 5, through another embodiment of an envelope panel in accordance with the present invention.

Figure 1:
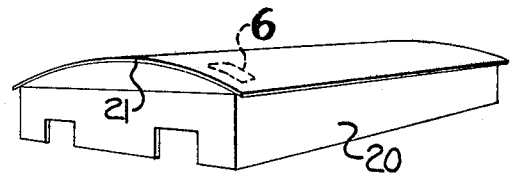
FIGURE 1 is a somewhat schematic perspective view of a building structure to which the system of the present invention is applied.
Figure 2:
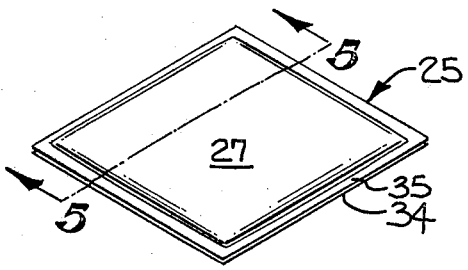
FIGURE 2 is a perspective view of one form of envelope panel in accordance with the present invention.

Referring now more particularly to the drawings, only a schematic illustration of a building structure 20 (FIGURE 1) to which a weatherproofing system in accordance with the present invention is applied has been included, as it is believed that the details of a suitable building structure will be clear to persons active in the construction industry. Further, once an understanding has been gained of the panel system of the present invention and the application of envelope panels to a supporting substrate structure to provide a weatherproof surface, it is contemplated that the use and application of the present invention will be entirely clear to persons skilled in the construction trades. Accordingly, while the discussion herein will proceed with reference to a roofing system, it should be understood at the outset that the present invention is not necessarily limited to use solely in that specific manner.

The illustrated structure 20 is representative of an industrial type building such as is constructed using a type of roof truss known as a bowstring truss, to thus obtain a roof configuration of generally parabolic curvature in cross-sectional configuration. While such a roof structure has been chosen for illustration purposes, it is readily apparent that the system of the present invention may be applied to any suitable substrate structure. Portions of the roofing structure for the building 20 including a roofing deck 21 of wooden planking or other materials known and used for such decking are additionally illustrated in FIGURES 6, 8 and 9.

Figure 3:
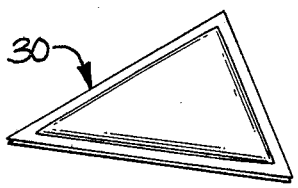
FIGURE 3 is a view similar to FIGURE 2 of a second form of envelope panel in accordance with the present invention.
Figure 4:
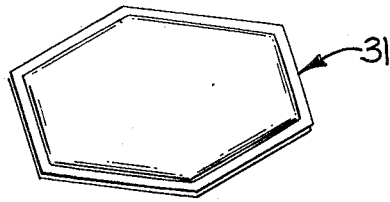
FIGURE 4 is a view similar to FIGURES 2 and 3 of a third form of envelope panel in accordance with the present invention.
Figure 5:
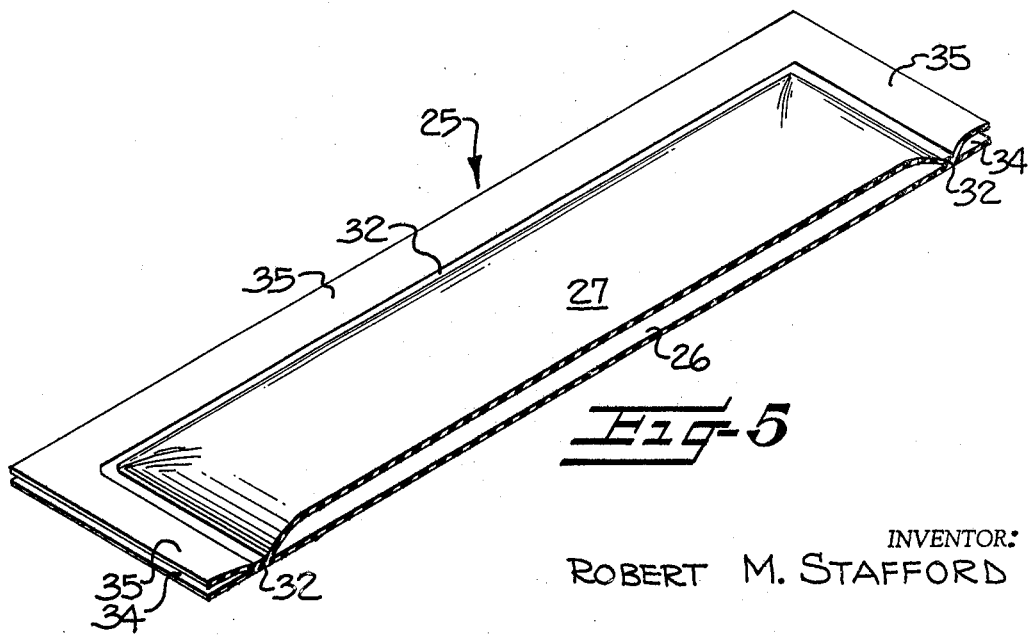
FIGURE 5 is an enlarged perspective view, in partial section, of a portion of the envelope panel of FIGURE 2, taken substantially along line 5—5 in that figure.

Secured to the decking 21 of the building 20 are a plurality of envelope panels 25 (FIGURES 2, 5, 6, 8 and 9). Each of the panels 25 has a predetermined geometrical outline configuration (rectilinear in the figures referred to) and includes a substrate engaging membrane 26 and an appearance surface membrane 27 (FIGURES 5, 8 and 9). It is contemplated by this invention that envelope panels such as the panels 25 may have any desired geometrical outline configuration, and an envelope panel 30 having a triangular configuration (FIGURE 3) and a panel 31 having a hexagonal outline configuration (FIGURE 4) are illustrated by way of emphasizing the complete freedom of choice available in the present invention. The membranes of an envelope panel, such as the membranes 26 and 27 of the panel 25, are secured together along a join or seal line (line 32 in FIGURE 5) extending entirely around the circumference of the panel, so that the membranes form a sealed envelope. Preferably, the seal line 32 at which the membrane is secured together is narrow in relation to the area of the panel and is spaced inwardly from the periphery of the panel a predetermined distance in order that the portions of the membranes 26 and 27 between the seal line 32 and the periphery of the panel may form a fastener flap 34 and a weather flap 35 for purposes to be pointed out more fully hereinafter.

In order to normally hold the membranes 26 and 27 in a predetermined spaced apart relation substantially throughout the area within and bounded by the seal line 32, a fluent filling material is introduced within the envelope formed by the sealed together membranes 26 and 27. Among other materials, the present invention contemplates that the filling material may be a suitable gas, such as nitrogen, introduced at a moderate pressure only sufficient to slightly balloon the sealed envelope of the panel 25 (as indicated by the membrane positions in FIGURES 5 and 8). By the inclusion of such a filling material within the envelope panel 25, the substrate engaging membrane 26 is free to closely follow any surface irregularities present on the supporting substrate structure such as the roof decking 21, while the appearance surface membrane 27 retains a smoothly contoured appearance due to the filling material cushion which maintains the membranes in spaced relation. Further, should any rippling or displacement of the substrate engaging membrane 26 occur, such appearance defects do not affect the appearance surface of the panel.

In the event that a panel 25 constructed in accordance with the present invention should become torn or punctured, a gaseous filling material will escape from the sealed envelope and the envelope will flatten, with the membranes coming into contact with one another. Upon such an occurrence, a visual inspection of a weatherproofed surface covered with such envelope panels will quickly reveal any panel from which filling material has escaped, permitting a possible leak to be quickly detected and repaired.

While these benefits have been described with reference to a gaseous filling material, it should be understood that the present invention contemplates that other fluent filling materials may be introduced into the sealed envelope. In particular, the fluent material or materials chosen may include fluids, both gases and liquids, and flowing solids. In choosing the filling materials or material, it must be borne in mind that the full potential of advantages available through the use of this panel system is best realized when a fluid is at least included in the filling material. Thus, while it may be readily understood that the use of a flowing solid as the only fluent filling material will permit obtaining the advantage of visual appearance discussed above and may provide an additional advantage of enhanced thermal insulation, the advantage of ready leak detection will not be obtained with a flowing solid filling unless such a solid filling material is used in conjunction with a secondary filling material of the type which would leak to provide the ready detection feature. However, any given application may only require that the appearance and insulation advantages be sought.

In applying the plurality of panels 25 to a supporting substrate structure such as a roof decking 21 in order to form a weatherproof surface thereon, an envelope panel 25 is positioned in substantially edge-abutting relationship to other panels and is secured to the substrate by suitable fastener means driven through the substrate engaging fastener flaps 34. Suitably, the fasteners may be roofing nails 36 (FIGURE 9) or other readily available and easily handled fasteners of this type. Then, in order to assure a weathertight surface on the building 20, an intermediate sealing strip 38 is cemented to the fastener flaps 34 and interposed between those flaps and the appearance flaps 35, covering the otherwise exposed heads of the fasteners 36 and providing a weather seal. Then, an appearance sealing strip 39 is similarly adhered or otherwise secured to the exposed upper surface of the appearance flaps 35 to further assure a waterproof seal of the joints between adjacent panels 25.

When installed on a substrate such as the roof decking 21 to provide a weatherproof surface, the plurality of envelope panels 25 provide several advantages over previous membrane roof structures in addition to those already described. In particular, it may be understood that the installation of the panels is relatively easy and may be handled by the average roofing mechanic, rather than requiring applicators with a high degree of skill. This flows in part from the use of conventional mechanical fasteners, rather than reliance upon adhesives for securement, and in part from the safety features resulting from provision of a double layer seal between adjacent panels. The double layer seal, by providing additional protection against the leakage of water through to the roof decking, provides a greater tolerance for poor workmansnip than would be the case with a conventional single membrane waterproofing system. By the securement of the plurality of panels to the substrate structure only about the peripheral edges of the panels, any normal thermal expansion and contraction of either of the membranes or shifting of the supporting substrate structure is readily accommodated by sliding of the substrate engaging membrane 26. Where the substrate engaging membrane adhesively secured to the surface of the substrate, as has been the practice heretofore, such sliding accommodation of these effects could not be obtained. Finally, the somewhat uneven surface texture obtained through the use of a plurality of slightly bulged envelope panels both contributes to an attractive visual appearance for the weatherproofed surface of a building and contributes to the lessening of wind lift forces on the membranes and decking.

It is contemplated that manufacture of envelope panels such as the panel 25 may be completed at a factory location in the event that the size of the panels to be employed is relatively small or completed in the field if the panels are too large to be easily handled. In either instance, the production of the panels begins with production of a pair of blanks of predetermined geometrical outline configuration from a stock of suitable membrane material. Membrane materials which are specifically contemplated by the present invention include neoprene, butyl rubber, Hypalon brand of chlorosulfonated polyethylene, polyisobutylene rubber, vinylidene chloride film, polyvinylchloride and fabrics of nylon, Dacron brand of synthetic polyester fiber, or other suitable textile fibers impregnated with or supporting neoprene, Hypalon, or Tedlar brand of polyvinylflouride. When an appropriate material of this type is selected and a pair of blanks of predetermined configuration are produced as by severing stock from such film, the blanks may then be secured together along a line extending at least substantially entirely around the circumference thereof to form thereof an envelope. The line along which the blanks are secured will correspond to the adhesion line 32 described above, and securement of the blanks may be achieved by any means appropriate for the materials chosen, such as by vulcanization, by adhesive securement or by heat sealing. The blanks may be secured together either entirely around the circumference of the panel, so as to form at that time a sealed envelope, or only partially about the circumference so as to leave an opening for insertion of filling material, depending upon the manner in which completion of manufacture is to be performed.

Thereafter, fluent filling material is introduced into the envelope formed by the membrane blanks so as to space the membranes apart substantially throughout the area of the panel and permit one of the membranes to accommodate surface irregularities of a supporting substrate structure while avoiding distortion of the other membrane, as described above. It is contemplated that the introduction of a filling material may take place either at the factory location or in the field where the panels are installed in a use location. The determination of whether the insertion of filling material is to be done at the factory or at a use location depends, in part, upon the size of the panels being installed and the particular manner in which the filling material is to be inserted. If the filling material is gaseous, it may be inserted by the use of an inflation needle or the like. In this instance, the envelope may be entirely sealed when the blanks are first joined and the small puncture or penetration point required for insertion of the inflation needle patched subsequent to the filling of the envelope. Such patching may be accomplished either in the factory or at the site of installation of the panels. Filling the panels at the site of installation may be selected as more convenient, as permitting more ready handling of the panels between the factory and the location of installation. In the event the filling material chosen is to include or be a liquid or a flowing solid, it may be preferable to leave a small area along the sealing line of the blanks open for the introduction of the filling material. Subsequent to such introduction of filling material, the blanks are sealed together to complete the sealed envelope.

Where the filing material is inserted into the panels at the site of installation and the blanks then sealed to complete the envelope, it is contemplated that the panel may first be installed on the supporting structure. In such an instance, the substrate engaging membrane will immediately conform to any surface irregularities of the substrate and the appearance advantages of the present invention are readily obtainable by insertion of a filling material which will substantially uniformly spread between the membrane blanks to space them apart in accordance with this invention. Should the puncture detection advantages of this invention as described above be considered unimportant, it is foreseen that an advantage of increased thermal insulation may be obtained consistent with the appearance advantages by choosing liquids for insertion which will react to create a foam material in situ, as is known in certain insulating procedures. An envelope panel 40 filled in this manner is shown (FIGURE 10) to include an inner foam material 41 filling, maintaining the panel membranes 46 and 47 in spaced relation.

In the drawings and specification, there have been set forth preferred embodiments of the invention, and although specific terms are employed, they are used in a generic and descriptive sense only and not for purposes of limitation.

I claim:
1. A weatherproofed structural system comprising:
    a substrate structure, and
    a plurality of limp envelope panels overlying and supported by said substrate structure for forming a weather surface thereover, each of said limp panels having a predetermined geometrical outline configuration and including a substrate engaging membrane and an apperance surface membrane, said membranes being juxtaposed and having portions thereof secured together adjacent to and around the the circumference of said limp panel for forming of said membranes a sealed envelope, each of said limp panels further including a limited quantity of filling material within the envelope formed by said membranes only sufficient for normally holding said membranes in predetermined spaced apart relation substantially entirely throughout the area of said limp panel with said panels remaining limp so that said substrate engaging membrane is distored in accommodation of any surface irregularities of said substrate structure while avoiding distortion of said appearance surface membrane remains substantially undistored.
2. A system according to claim 1 and wherein said membranes include a fluid impervious elastomeric film and said filling material includes a fluid so that, upon either of said membranes being penetrated, said fluid filling material escapes from said envelope and said envelope collapses to indicate the danger of water leakage.

3. A system according to claim 2 and wherein said membranes further include a textile fabric supporting said elastomeric film and said filling material is gaseous.

4. A system according to claim 1 and wherein the portions of said membranes which are secured together define a sealing line which is narrow in relation to the area of said panel and is spaced inwardly from the periphery of said panel a predetermined distance.

5. A system according to claim 4 and further comprising fastener means securing said substrate engaging membrane intermediate the periphery thereof and said sealing line to said substrate structure and sealing strip means overlapping peripheral edge portions of the membranes of adjacent panels for sealing the juncture of such panels against water leakage.

References Cited

UNITED STATES PATENTS

| | | | |
|---|---|---|---|
| 3,059,656 | 10/1962 | Seubert et al. | 52—2 |
| 3,292,338 | 12/1966 | MacClarence et al. | 52—2 X |
| 3,332,177 | 7/1967 | Sepp | 52—2 |

FRANK L. ABBOTT, Primary Examiner

P. C. FAW, Jr., Assistant Examiner

U.S. Cl. X.R.

52—105, 465, 478, 615; 161—43

PO-1050
(5/69)

UNITED STATES PATENT OFFICE
CERTIFICATE OF CORRECTION

Patent No. 3,481,087                    Dated December 2, 1969

Inventor(s)   Robert M. Stafford

It is certified that error appears in the above-identified patent and that said Letters Patent are hereby corrected as shown below:

Column 1, line 23 "waterproofining" should be --waterproofing--.
Column 4, line 66 "tne" should be --the--.
Column 5, line 18 "workmansnip" should be --workmanship--.
Column 6, line 22 "filing" should be --filling--; line 56 "apperance" should be --appearance--; line 68 "distored" should be --distorted--; line 69 "avoiding distortion of" should be deleted Signed and sealed this 6th day of July 1971.

(SEAL)
Attest:

EDWARD M. FLETCHER, JR.               WILLIAM E. SCHUYLER, JR.
Attesting Officer                     Commissioner of Patents